(12) United States Patent
Filipenko et al.

(10) Patent No.: US 10,894,607 B2
(45) Date of Patent: Jan. 19, 2021

(54) DRIVE SYSTEM FOR A VEHICLE WITH AN INTERNAL COMBUSTION ENGINE AND FUEL TANK

(71) Applicant: Siemens Aktiengesellschaft, Munich (DE)

(72) Inventors: Mykhaylo Filipenko, Erlangen (DE); Michael Frank, Uttenreuth (DE); Thomas Gleixner, Erlangen (DE); Johannes Richter, Fürth (DE); Peter van Hasselt, Erlangen (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 7 days.

(21) Appl. No.: 16/339,885

(22) PCT Filed: Sep. 14, 2017

(86) PCT No.: PCT/EP2017/073071
§ 371 (c)(1),
(2) Date: Apr. 5, 2019

(87) PCT Pub. No.: WO2018/068979
PCT Pub. Date: Apr. 19, 2018

(65) Prior Publication Data
US 2020/0047908 A1    Feb. 13, 2020

(30) Foreign Application Priority Data
Oct. 11, 2016    (DE) .................. 10 2016 219 680

(51) Int. Cl.
*B64D 33/08*    (2006.01)
*B64D 27/02*    (2006.01)
(Continued)

(52) U.S. Cl.
CPC ............. *B64D 33/08* (2013.01); *B64D 27/02* (2013.01); *B64D 27/10* (2013.01); *B64D 27/24* (2013.01);
(Continued)

(58) Field of Classification Search
CPC ........ B64D 27/02; B64D 27/08; B64D 27/10; B64D 27/24; B64D 33/08; B64D 35/02;
(Continued)

(56) References Cited

U.S. PATENT DOCUMENTS

| 4,474,001 A | 10/1984 | Griffin et al. .................... 60/204 |
| 4,516,044 A | 5/1985 | Bone ............................... 310/64 |

(Continued)

FOREIGN PATENT DOCUMENTS

| DE | 10 2005 000 642 A1 | 8/2005 | ............... H02K 5/20 |
| DE | 10 2005 032 204 A1 | 1/2007 | ............... H02K 9/19 |

(Continued)

OTHER PUBLICATIONS

German Office Action, Application No. 10 2016 219 680.4, 7 pages, dated Aug. 8, 2017.
(Continued)

*Primary Examiner* — Tulsidas C Patel
*Assistant Examiner* — Rashad H Johnson
(74) *Attorney, Agent, or Firm* — Slayden Grubert Beard PLLC (57) ABSTRACT

Various embodiments include a drive system for a vehicle, the system comprising: an internal combustion engine for converting chemical energy stored in a liquid fuel into mechanical energy; a fuel tank for storing fuel for use by the internal combustion engine; and an electric machine having a rotor, a stator, and a cooling system for cooling at least one
(Continued)

component of the electric machine using a cooling liquid. The cooling liquid comprises the fuel.

13 Claims, 4 Drawing Sheets

(51) Int. Cl.
*B64D 27/10* (2006.01)
*B64D 27/24* (2006.01)
*B64D 35/02* (2006.01)
*B64D 37/30* (2006.01)
*F02C 3/00* (2006.01)
*H02K 9/00* (2006.01)

(52) U.S. Cl.
CPC ............. *B64D 35/02* (2013.01); *B64D 37/30* (2013.01); *F02C 3/00* (2013.01); *H02K 9/00* (2013.01); *B64D 2027/026* (2013.01)

(58) Field of Classification Search
CPC .... B64D 37/30; B64D 2027/026; H02K 9/00; H02K 9/19; F02C 3/00
USPC .................................. 310/52, 54, 58, 64, 89
See application file for complete search history.

(56) References Cited

U.S. PATENT DOCUMENTS

| | | | |
|---|---|---|---|
| 4,816,709 A * | 3/1989 | Weldon ................. | H02K 7/025 310/178 |
| 5,223,757 A | 6/1993 | Staub et al. .................... | 310/54 |
| 6,415,595 B1 | 7/2002 | Wilmot, Jr. et al. ........... | 60/785 |
| 2005/0151431 A1 | 7/2005 | Cronin et al. .............. | 310/60 A |
| 2006/0043801 A1 | 3/2006 | Adra ............................... | 310/54 |
| 2006/0254255 A1 | 11/2006 | Okai et al. .................. | 60/226.1 |
| 2007/0007830 A1 | 1/2007 | Reisch et al. .................. | 310/54 |
| 2014/0373531 A1 * | 12/2014 | Wong ...................... | F02B 39/10 60/605.1 |
| 2015/0233296 A1 * | 8/2015 | Kraft ......................... | F02C 9/50 60/776 |
| 2016/0214727 A1 * | 7/2016 | Hamel .................... | B64C 21/06 |
| 2016/0237964 A1 * | 8/2016 | Huscher .................. | H02K 9/14 |
| 2016/0332520 A1 * | 11/2016 | Miller ..................... | B60L 50/16 |
| 2019/0300196 A1 * | 10/2019 | Surawski ............... | B64D 37/32 |

FOREIGN PATENT DOCUMENTS

| | | | | |
|---|---|---|---|---|
| DE | 10 2013 001 872 A1 | 8/2014 | ............. | B60R 16/02 |
| DE | 10 2014 216 354 A1 | 2/2015 | ................ | F01P 3/12 |
| DE | 10 2014 208 957 A1 | 11/2015 | ............. | B60K 1/04 |
| EP | 1 630 930 A2 | 3/2006 | ............. | H02K 1/20 |
| EP | 3 048 042 A1 | 7/2016 | ............. | B64C 21/06 |
| FR | 2 936 393 A1 | 3/2010 | ............. | B60L 11/00 |
| GB | 2 095 757 A | 10/1982 | ................ | F02C 7/06 |
| WO | 02/16743 A1 | 2/2002 | ............. | B64D 13/00 |
| WO | 2018/068979 A1 | 4/2018 | ............. | B64D 27/24 |

OTHER PUBLICATIONS

International Search Report and Written Opinion, Application No. PCT/EP2017/073071, 23 pages, dated Dec. 15, 2017.

* cited by examiner

DRIVE SYSTEM FOR A VEHICLE WITH AN INTERNAL COMBUSTION ENGINE AND FUEL TANK

CROSS-REFERENCE TO RELATED APPLICATIONS

This application is a U.S. National Stage Application of International Application No. PCT/EP2017/073071 filed Sep. 14, 2017, which designates the United States of America, and claims priority to DE Application No. 10 2016 219 680.4 filed Oct. 11, 2016, the contents of which are hereby incorporated by reference in their entirety.

TECHNICAL FIELD

The present disclosure relates to vehicles. Various embodiments may include a drive system for a vehicle, in particular an aircraft, a drive system, and/or a method for cooling an electric machine in such a drive system.

BACKGROUND

In conventional electric machines, which are designed for powering vehicles, any cooling necessary in their operation is typically achieved by a cooling system, through which a cooling liquid is pumped into the areas of the machine that are to be cooled. In particular, such cooling liquids are often pumped through the stator of the machine. In the process they are circulated in a closed cooling circuit in which they are cooled back down to a lower temperature at a location physically remote from the machine. For this purpose, heat exchangers are often used in order to dissipate the heat, absorbed by the cooling liquid in the area of the machine, to another medium, for example the ambient air.

In electric machines with direct cooling of the winding, the coolant is brought into direct contact with the winding to be cooled, for example the stator winding. To do this, the cooling medium needs to be electrically insulating, so that water-based cooling liquids are generally ruled out for this purpose. Further requirements demanded of the cooling liquid are a low viscosity with high specific heat capacity, in order to be able to achieve high heat transfer coefficients for low pressure losses. According to the prior art, for example, the liquid marketed by 3M under the brand name Novec 7500, which is composed of the hydrofluoroether $C_7F_{15}OC_2H_5$, is used for cooling stator windings. This liquid is electrically insulating and at 25° C. has a specific heat capacity of 1.13 kJ/kg·K and a kinematic viscosity of 0.77 mm$^2$/s. Since it is moreover incombustible and non-inflammable, it is well-suited to cooling windings in electric machines. According to the prior art, such incombustible and non-inflammable cooling liquids are commonly used for machine cooling, in order to avoid an additional risk potential.

One disadvantage to the use of such conventional cooling liquid, above all with high machine power outputs, is that a relatively large volume of coolant is needed in the cooling circuit in order to achieve effective cooling of the machine. This contributes to the overall weight of the machine, which has a negative effect on the power density of the machine. Furthermore, this volume of coolant must be thermally well connected to a further medium—for example the ambient air—in order to keep the coolant constantly in a temperature range suitable for cooling the machine. For this purpose, additional heat exchanger structures are often needed, which likewise contribute to the overall weight of the machine.

SUMMARY

The teachings of the present disclosure describe a drive system for a vehicle, in particular an aircraft, which overcomes said disadvantages. In particular, it describes a drive system having an electric machine, in which a cooling system for cooling the electric machine contributes little to the overall weight of the machine. For example, some embodiments include a drive system (9) for a vehicle, in particular an aircraft (1), comprising: an internal combustion engine (15) for converting chemical energy stored in a liquid fuel (12) into mechanical energy, a fuel tank (14) for supplying the internal combustion engine (15) with fuel (12), and an electric machine (11,21) having a rotor (11a, 21a) and a stator (11b,21b), and a cooling system for cooling at least one component (11c,21c) of the electric machine (11,21) using a cooling liquid (12), wherein the cooling system is designed to use the fuel (12) of the internal combustion engine (15) as cooling liquid for the electric machine (11,21).

In some embodiments, the fuel (12) is kerosene.

In some embodiments, the electric machine (11,21) has a power density of at least 5 kW/kg and/or a rated output of at least 5 MW.

In some embodiments, the internal combustion engine (15) comprises a gas expansion turbine (16) and a turbine shaft (18), wherein the gas expansion turbine (16) is designed to transmit the mechanical energy generated to the turbine shaft (18).

In some embodiments, the electric machine is embodied as a generator (21), in order to convert the mechanical energy generated by the internal combustion engine (15) into electrical energy for powering the vehicle (1).

In some embodiments, the electric machine is embodied as a motor (11) in order to power the vehicle (1) electrically.

In some embodiments, the electric machine (11,21) comprises at least one coil winding (11c,21c), which is so designed that it can be directly cooled by the cooling liquid (12).

In some embodiments, the cooling system comprises a coolant admission line (27), which is designed to carry fuel (12) from the fuel tank (14) to an area (11c,21c) of the electric machine (11,21) to be cooled.

In some embodiments, the cooling system comprises a first coolant discharge line (29a), which is designed to carry at least some of the fuel (12), heated by the electric machine (11,21), to the internal combustion engine (15).

In some embodiments, the cooling system comprises a second coolant discharge line (29b), which is designed to carry at least some of the fuel (12), heated by the electric machine (11,21), back into the fuel tank (14).

As another example, some embodiments include a vehicle, in particular an aircraft (1), having a drive system (9) as claimed in one of the preceding claims.

As another example, some embodiments include a method for cooling an electric machine (11,21) in a drive system (9) as described above, which comprises the following step: feeding fuel (12) from the fuel tank (14) into the cooling system and using the fuel (12) as cooling liquid for cooling at least one component (11c,21c) of the electric machine (11,21).

In some embodiments, following use of the fuel (12) as cooling liquid at least a portion of the fuel (12) thus heated by the machine (11,21) is fed into the internal combustion engine (15).

In some embodiments, only a portion (x) of the fuel (12) heated by the electric machine (11,21) is fed into the internal combustion engine (12), and the remainder (y) is carried back into the fuel tank (14).

In some embodiments, the fraction (x) of the fuel heated by the electric machine that is carried into the internal combustion engine (15) is controlled by a control device (31).

BRIEF DESCRIPTION OF THE DRAWINGS

The teachings of the present disclosure are further described below on the basis of some exemplary embodiments, referring to the drawings attached, in which.

DETAILED DESCRIPTION

The teachings of the present disclosure describe a drive system for a vehicle including an internal combustion engine for converting chemical energy stored in a liquid fuel into mechanical energy. It further comprises a fuel tank for supplying the internal combustion engine with fuel. In addition, it comprises an electric machine having a rotor and a stator, and a cooling system for cooling at least one component of the electric machine using a cooling liquid. Here the cooling system is designed to use the fuel of the internal combustion engine as cooling liquid for the electric machine.

In some embodiments, the liquid fuel for the internal combustion engine and the cooling liquid of the electric machine are identical. The electric machine may be a motor or a generator, or also a machine which is designed for both operating modes. The drive system may in particular comprise both a generator and a motor, of which at least one machine is cooled using the fuel as cooling liquid. The drive system then relies, overall, on mechanical energy first being generated in the combustion engine from the energy of the fuel. This can be converted in the generator into electrical energy, which is then used by the motor to power the vehicle. In this way a fully electrical drive, in particular, is available, the energy for which is obtained on-board from the fuel.

In some embodiments, the electric machine is effectively cooled without making an additional contribution to the weight due to an additional cooling liquid. Instead, the fuel that would in any case be needed to obtain the energy is used as cooling liquid. This therefore involves a synergistic effect, in which the same liquid is able to fulfil two separate functions, making it possible to increase the overall power density of the drive system compared to the prior art. In some embodiments, no further liquid coolant at all, other than the liquid fuel, is used for cooling at least one of the on-board electric machines. Both the generator and the motor can be cooled using fuel as the cooling liquid. In particular, all such generators and motors used for drive purposes may be cooled in this way.

In some embodiments, at least one of the on-board machines is at least in part cooled by the fuel. The fuels used for powering aircraft are typically electrically insulating and have a high specific heat capacity. Like the Novec 7500 previously described, for example, they are thereby suited to the cooling of electric machines, in particular for direct cooling of the windings. Furthermore, they have a sufficiently low viscosity and a sufficiently low vapor pressure at the operating temperature, together with a sufficiently high thermal conductivity.

In contrast to conventional cooling liquids for electric machines, the fuel is theoretically both combustible and inflammable. For this reason, on the basis of typical specifications it would not be used as cooling liquid for such machines. Since a considerable volume of fuel is already present on board the aircraft anyway, however, its use as cooling liquid creates no additional source of risk. It is merely necessary, through design measures, to prevent an increased risk of fire in the area of the electric machine to be cooled. Here the operating temperature of the cooling liquid in the electric machine may lie, in particular, in the range between −45° C. and 120° C.

The fuel and hence the cooling liquid can here either basically be seen as part of the drive system, or the drive system is only designed to be used with such a fuel. In some embodiments, a vehicle comprises an aircraft equipped with a drive system described herein. The methods described herein serve for cooling an electric machine in a drive system incorporating teachings of the present disclosure and comprises at least the following step: feeding fuel from the fuel tank into the cooling system and using the fuel as cooling liquid for cooling at least one component of the electric machine. In some embodiments, the vehicle and the method share analogous advantages as described for the drive system. The various embodiments of the drive system, the vehicle, and the cooling method described here may generally be advantageously combined with one another.

In some embodiments, the fuel may comprise kerosene. In the present context, kerosene is taken to mean an aviation turbine fuel, for example a fuel of the Jet A, Jet A-1, Jet B, TS-1 or JP-1 to JP-8 type or a similar light fuel specified for this purpose. Kerosene has a relatively high specific heat capacity and thermal conductivity and a low viscosity. Thus, the specific heat capacity of the fuel at 25° C. may generally be at least 1.5 kJ/kg·K, in particular at least 1.7 kJ/kg·K, or even at least 2.0 kJ/kg·K. The kinematic viscosity of the fuel at 25° C. may generally lie in the range up to 3 mm$^2$/s, in particular up to 2 mm$^2$/s. The thermal conductivity of the fuel may be at least 0.1 W/m·K, in particular between 0.1 and 0.15 W/m·K. Kerosene comes within these value ranges.

In some embodiments, the electric machine has a power density of at least 5 kW/kg. The power density may be at least 10 kW/kg or even at least 20 kW/kg, In some embodiments, it may have a rated output of at least 5 MW, in particular at least 10 MW or even at least 20 MW. The ranges stated apply irrespective of whether the electric machine is a generator or a motor of the drive system. The ranges stated for the rated output and the power density correspond to the typical requirements for a commercial, electrically powered aircraft.

The volume of the fuel tank for such an electrically powered vehicle may be at least 1 m$^3$, in particular at least 5 m$^3$ or even at least 20 m$^3$. Such large volumes are needed to power a small to medium-sized aircraft. The advantages described herein accrue particularly with such a large volume of fuel, since then a lot of liquid fuel is available, which can at the same time be used as cooling liquid for the electric machine.

In some embodiments, the internal combustion engine may comprise a gas expansion turbine and a turbine shaft, wherein the gas expansion turbine is designed to transmit the mechanical energy generated to the turbine shaft. This turbine shaft may suitably have a torque-transmitting coupling to a rotor shaft of the generator, in order to transmit the mechanical energy to the rotor of the generator. It is thus possible, overall, to convert the chemical energy of the fuel into electrical energy via the intermediate step of generating mechanical energy in the generator. In some embodiments, the internal combustion engine may in principle also be of different design. It is essential only that it be suited to the conversion of chemical energy, stored in the fuel, into mechanical energy. It may therefore also be a piston engine, for example.

In some embodiments, an electric machine can be cooled by the fuel and may in particular be embodied as a generator. This generator may convert the mechanical energy generated by the internal combustion engine into electrical energy for powering the vehicle. Cooling the generator using the fuel as cooling liquid, since the internal combustion engine and the fuel tank are suitably arranged in spatial proximity to the generator, since the mechanical energy has in any case to be transmitted via shafts from the internal combustion engine to the generator. This spatial proximity means that the fuel is also available as coolant close to the generator. Since one or more powerful generators are needed for generating the electrical energy needed for the drive, there is any event a need for an efficient cooing system.

In some embodiments, the drive system comprises a motor for electrically powering the vehicle, using the electrical energy generated by the generator. This motor may also be cooled using the fuel as coolant. In some embodiments, it may also in principle be cooled in some other way, for example using a different liquid and/or gaseous coolant.

In some embodiments, the electric machine can be cooled by the fuel and may alternatively also be embodied as a motor. This motor may, in particular, to power the vehicle—in particular the aircraft—electrically. The drive system then additionally comprises a generator, in order to convert the mechanical energy generated by the internal combustion engine into electrical energy for powering the vehicle. This generator may optionally also be cooled using the fuel as coolant. In some embodiments, it may also in principle be cooled in some other way, for example using a different liquid and/or gaseous coolant.

In some embodiments, the component of the electric machine to be cooled may comprise a stator winding in the stator of the machine. In the area of the stator winding of a machine a particularly large amount of heat is typically released, which in the operation of the machine has to be efficiently cooled in order to avoid overheating of the winding. An efficient stator cooling is a difficult challenge, particularly in machines with a high power output and a high power density.

In some embodiments, the electric machine comprises at least one coil winding, which is configured so that it can be directly cooled by the cooling liquid. This coil winding may then, in particular, comprise a stator winding. A directly cooled coil winding is taken to mean such a winding which can come into direct contact with the cooling liquid. That is to say the coil winding may receive an incident flow or a flow of coolant passing around it. Either the electrical conductor of the winding itself or an insulating, impregnating and/or protective layer surrounding the conductor may be in direct contact with the coolant, so that the coil winding is able to dissipate the heat produced in operation to the coolant. In some embodiments, the thermal connection of the coolant to the coil winding is not achieved through additional thermally conductive cooling structures over some spatial distance, but the coolant is in direct contact with a component of the coil winding. Such a directly cooled winding eliminates the weight contributed by additional heat-transmitting components. In principle it is also possible, however, to connect the fuel to the winding via such an additional, thermally conductive component. This may be advantageous, particularly when the dielectric strength of the fuel is not high enough or it is too easily inflammable at the operating temperature to be brought into direct contact with the winding. In some embodiments, the component of the electric machine to be cooled may also be one or more other components that heat up when in operation. This may also relate, for example, to structural components, such as the housing of the machine, for example.

In some embodiments, the cooling system of the electric machine may comprise an additional coolant admission line to carry fuel from the fuel tank to an area of the electric machine to be cooled. Such an admission line is an easy way of allowing the fuel to be used as coolant to pass from the tank into the area of the electric machine. The fuel here is led through the admission line, thereby preventing inflammable fuel getting into other areas of the machine in which an increased risk of fire can potentially occur. The admission line can serve supply the fuel from the relatively large reservoir of the fuel tank, in which it is stored at a comparatively low temperature. For example, in the operation of the vehicle the temperature of the fuel tank may lie in the range between −45° C. and approximately 50° C., that is say significantly lower than the operating temperature in the area of the electric machine to be cooled, which may lie in the range between 100° C. and 170° C., for example. The cooling system may optionally comprise a pump in order to transport the fuel through the admission line into the area of the electric machine to be cooled.

In some embodiments, the cooling system may also comprise a first coolant discharge line to carry at least some of the fuel, heated by the electric machine, to the internal combustion engine. By using it as cooling liquid for the electric machine, the fuel can be heated in operation to a temperature ranging between −40° C. and 120° C., in particular between 0° C. and 120° C. The fuel at such an outlet temperature may be used in the internal combustion engine either undiluted or mixed with further fuel additionally supplied directly from the fuel tank.

Such pre-heating of the fuel may improve the combustion in the engine, since in the case of fuel tanks in aircraft, in particular, the very cold ambient air can often make the temperature too low for optimum combustion. If the outlet temperature of the fuel after cooling the electric machine is too high for optimum combustion, colder fuel from the tank may be added. For this purpose, a further, direct fuel feed line may be provided between the fuel tank and the internal combustion engine. Here the mixing ratio between fuel used as coolant and fuel fed in directly from the tank may, where necessary, be controlled by an optional control unit. Such a control can be used to supply a predefined and possibly varying quantity of fuel in a predefined and possibly varying temperature range.

In some embodiments, the cooling system may comprise a second coolant discharge line to carry at least some of the fuel heated by the electric machine back into the fuel tank. Such a second coolant discharge line may provide a larger flow of liquid is needed for cooling the electric machine than is needed for use as fuel in the internal combustion engine. Then, the combination of first and second coolant discharge line, in particular, is useful in order to carry a specific proportion of heated fuel into the internal combustion engine and to return the remainder to the fuel tank. The remainder of the preheated fuel thus returned can be cooled down again during the time it spends back in the fuel tank. In particular, an exchange of heat with the surroundings (especially with the relatively cool ambient air when an aircraft is operating at higher altitudes) can prevent overheating of the overall reserve of fuel. Here too, a control unit may suitably be provided, in order to able to dynamically adjust the proportion of heated fuel to be fed into the internal combustion engine and the proportion of fuel pumped back into the tank.

In some embodiments, a vehicle provided with the drive system may comprise, in particular, an aircraft. The fuel tank of the drive system may be arranged in the area of one or more wings. Where it is divided between multiple wings, the fuel tank may be divided into multiple sub-tanks. The arrangement in the area of the wings may achieve efficient cooling of the fuel by the cold ambient air. Thus, the fuel in the fuel tank can be kept at a low overall temperature level, which is generally beneficial for the use as cooling liquid. Such cooling is especially useful, above all when a portion of the preheated fuel is carried back into the tank, in order to avoid prolonged over-heating of the reserve of fuel. If the fuel tank is arranged in the area of the wings, the wings and/or the wall of the tank itself act as heat exchanger to give off heat to the ambient air. The fuel tank and/or the wing(s) may optionally in addition comprise one or more further heat exchange structures, for example cooling fins for improved dissipation of heat to the ambient air.

In some embodiments, a method for cooling the electric machine, following use of the fuel as cooling liquid, includes feeding at least a portion of the fuel thus heated by the machine into the internal combustion engine. In particular, in some embodiments, only a portion of the fuel may be fed into the internal combustion engine, the remainder being carried back into the fuel tank. In some embodiments, the proportion of the fuel heated by the electric machine that is carried into the internal combustion engine may optionally be controlled by a control device.

Figure 1:
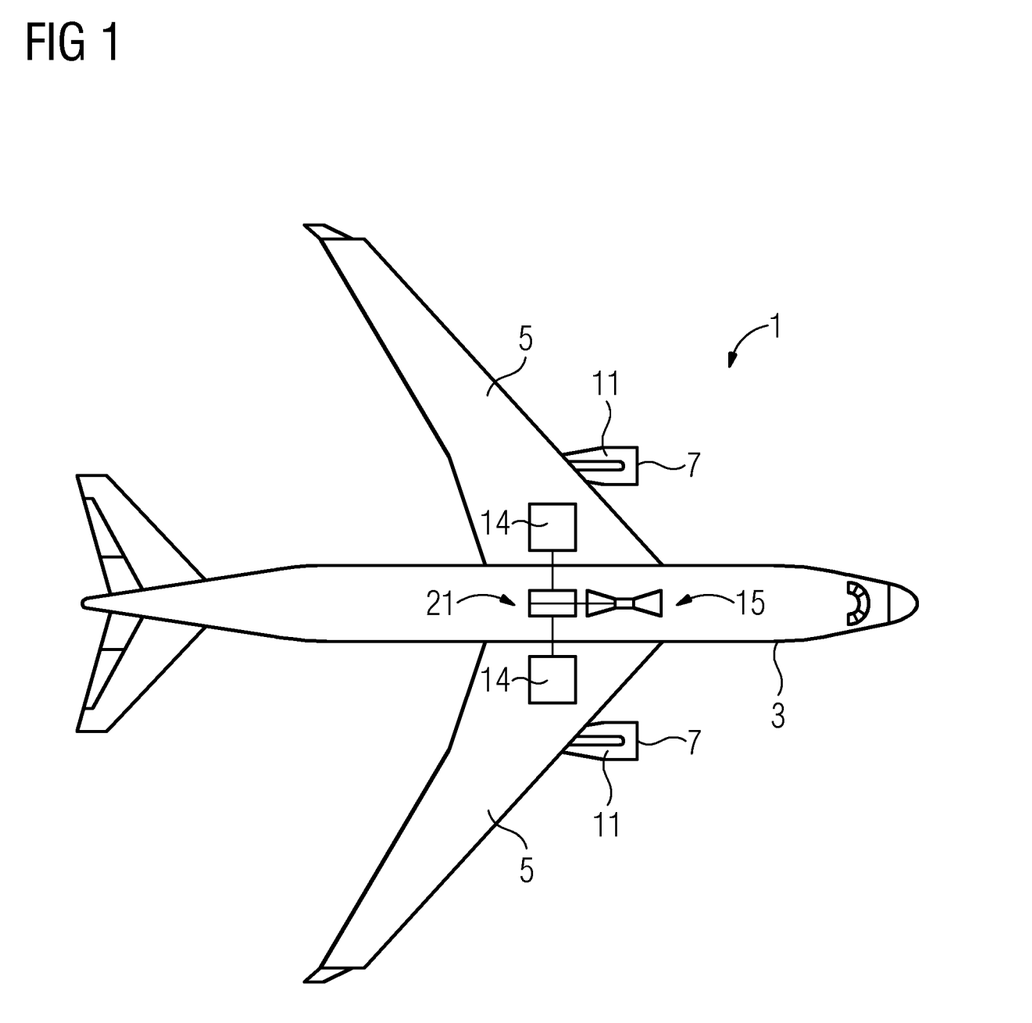
FIG. 1 shows a schematic representation of an aircraft incorporating teachings of the present disclosure.

FIG. 1 shows a representation of an aircraft 1 according to a first example of the teachings herein in a schematic view. The aircraft 1 comprises a fuselage 3 and two wings 5, each having nacelles 7 arranged on the wings 5. Two electric motors 11 (not represented in more detail here), which together produce the propulsion for the aircraft, are arranged inside the two nacelles 7. In principle, however, propulsion by only one electric motor is possible, which may also be arranged elsewhere on the aircraft. Equally, propulsion may also be provided by more than two such nacelles.

In some embodiments, an electrical current for the electric motors 11 is generated by means of a generator 21, the mechanical energy for the generator 21 being supplied by an internal combustion engine 15. In this example, the internal combustion engine 15 and the generator 21 are both arranged in the fuselage 3 of the aircraft 1. The fuel needed for the operation of the internal combustion engine 15 is here delivered from two fuel tanks 14, which are arranged inside the two wings 5 of the aircraft 1. Other locations for the fuel tanks are also feasible, however, and in principle only one fuel tank is needed. As is schematically indicated by two connecting lines and explained in more detail below, the fuel is fed into the internal combustion engine 15 by way of the generator 21. The generator 21 is connected to the two motors 11 by electrical supply lines (likewise not shown here). It is also possible to provide multiple such on-board internal combustion engines and/or generators. Overall, therefore, the aircraft 1 shown is a hybrid-electrically powered aircraft, in which the propulsion is provided entirely by electric motors 11 and in which the electrical current needed for this purpose is generated from a fuel on board the aircraft 1.

Figure 2:
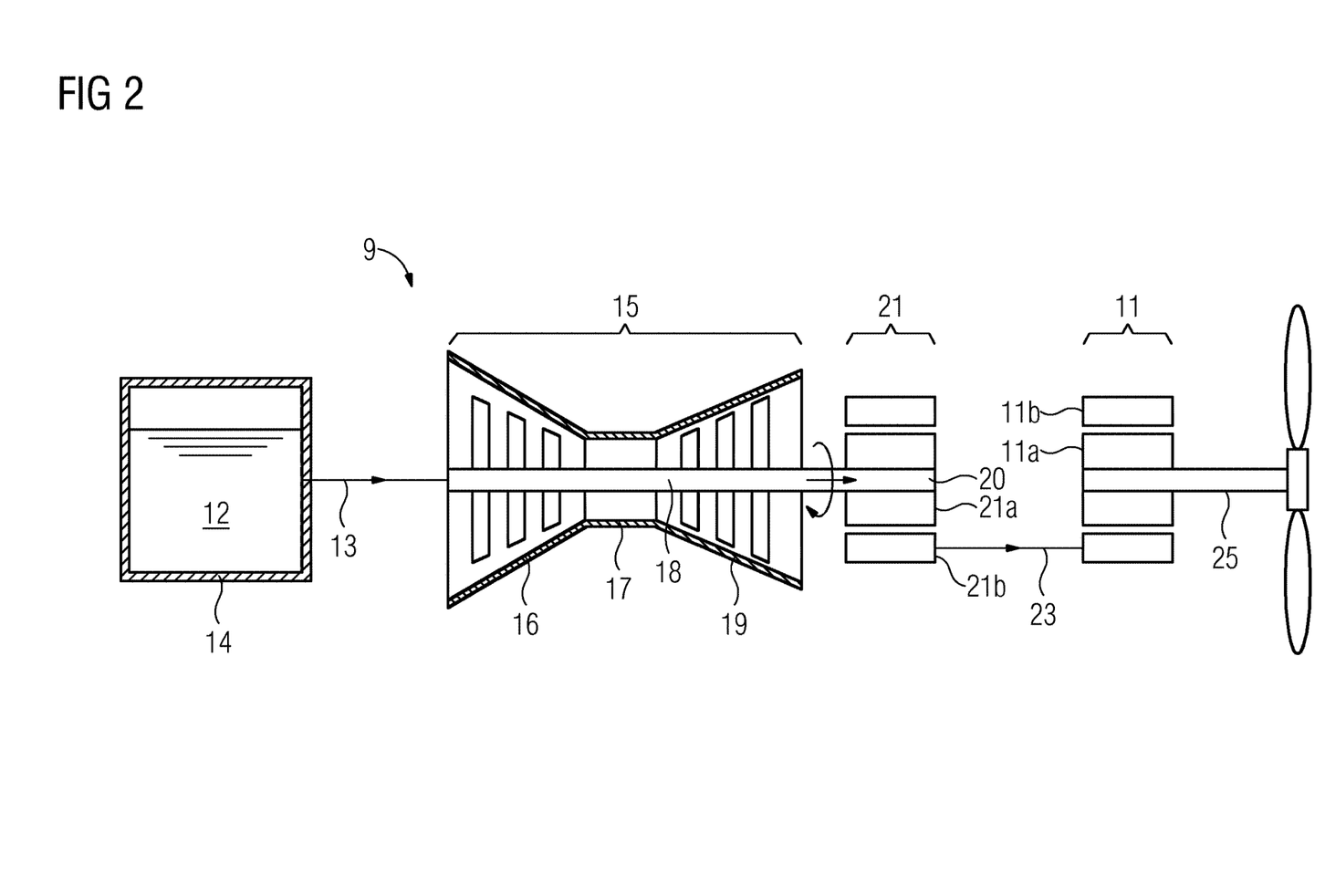
FIG. 2 shows a schematic representation of the main energy flux in a drive system incorporating teachings of the present disclosure.

FIG. 2 shows a schematic representation of the energy flux in a drive system 9 for an electrically powered aircraft. This aircraft may be constructed in a way similar to that shown in FIG. 1, for example. In principle, however, it may also comprise a different number and/or arrangement of motor(s), generator(s) and fuel tank(s). In the diagram in FIG. 2 the direction of the energy flux leads from left to right, as indicated by arrows. The fundamental source of energy is the liquid fuel 12, which is provided in at least one fuel tank 14. Here the fuel tank 14 shown may also stand to represent multiple such fuel tanks. The same applies to the other components shown.

The fuel 12 is carried from the fuel tank to the internal combustion engine 15 by means of a fuel feed line 13. As is explained in more detail below, fuel is not fed in directly, at least some of the fuel instead being fed via a part of at least one of the on-board electric machines 11 or 21 that is to be cooled. For the sake of clarity, this is not represented in the energy flux diagram in FIG. 2. In some embodiments, the fuel 12 is fed into the internal combustion engine 15 at any time and that the chemical energy of this fuel is there converted into mechanical energy, in the form of a mechanical rotation of the turbine shaft 18 of the internal combustion engine, as is indicated by the rotated arrow in the right-hand part of the internal combustion engine.

In some embodiments, the internal combustion engine 15 comprises a compressor 19, a combustion chamber 17, and a gas expansion turbine 16. Air is drawn into the internal combustion engine 15 and compressed by the compressor 19 and is then burned in the combustion chamber 17 together with the fuel introduced and mixed with the air. The hot gas produced is expanded in the gas expansion turbine 16 and here by way of the turbine blades, indicated only schematically, drives the turbine shaft 18. For transmitting mechanical energy, the latter is coupled to the rotor shaft 21a of the generator 21 represented further to the right. The generator 21 comprises a rotor 21a and a stator 21b, the rotor in the example shown being rotatably supported inside the stator 21b by means of the rotor shaft 20. In order to obtain an especially lightweight generator 21 for use in the aircraft 1, the rotor 21a and/or the stator 21b may advantageously be provided with one or more superconducting windings. Normally conducting windings may also be used, however.

In some embodiments, the generator may be suitable for converting mechanical energy, fed in via the rotor shaft 20, into electrical energy. The electrical energy may then be led to at least the one motor 11 of the aircraft 1 via at least one electrical supply line 13. This electric motor 11 in turn comprises a stator 11b and a rotor 11a on a rotor shaft 25, the thrust of the aircraft 1 being generated from the rotation of the rotor. The additional energy flux which occurs in the drive system due to the additional use 12 of the fuel as coolant is not taken into account in FIG. 2. Two different possible fuel flows through the drive system are explained in connection with the two following examples.

Figure 3:
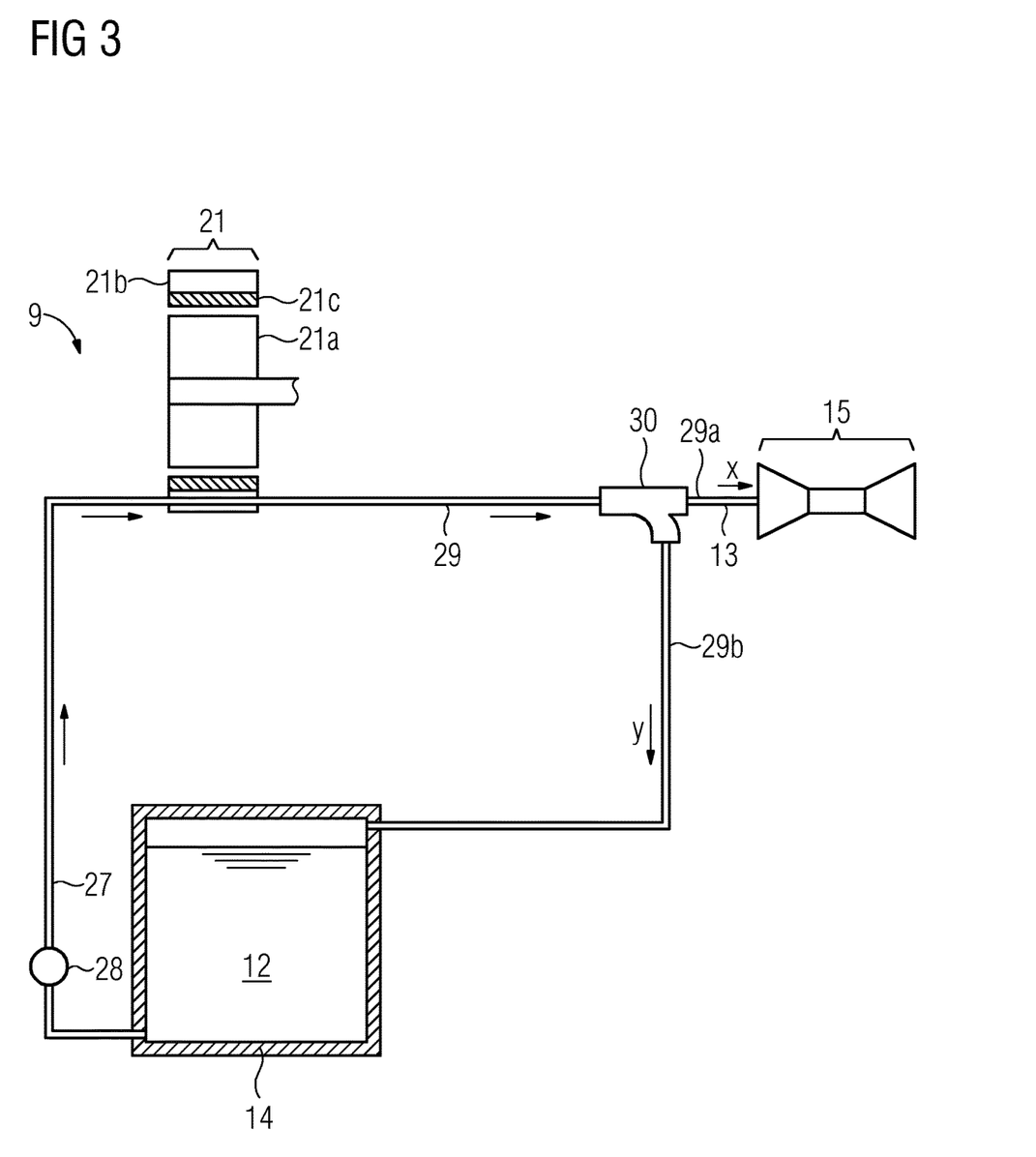
FIG. 3 shows a schematic representation of the flow of fuel in a drive system incorporating teachings of the present disclosure.

FIG. 3 shows a somewhat more detailed schematic representation of the flow of fuel 12 through the various components of a drive system 9 according to one example of the invention. This drive system 9 may be configured thus having particular regard to the fundamental energy flux, as has been explained in connection with FIG. 2. In some embodiments, it comprises a fuel tank 14, a generator 21, and an internal combustion engine 15. The fuel 12 is fed out of the fuel tank 14 by means of a pump 28 and via a coolant admission line 27 into the generator 21 as coolant. In more precise terms, it is introduced into the stator 21b of the generator 21, so that it comes into thermal contact with the stator winding 21c.

In operation this component of the generator 21 is heated up most, and for this reason should be continually cooled, in order to avoid overheating. In the example shown a direct cooling of the winding by the fuel is used for this purpose. The mechanical coupling of the rotor shaft of the generator 21 to the turbine shaft of the internal combustion engine 15 is not represented in more detail in FIG. 3.

In some embodiments, the fuel 12, heated by the cooling of the generator 21, is used further: first the fuel 12, preheated in this way, is led away from the generator via a common coolant discharge line 29. A three-way directional control valve 30 connected to the output side of the generator divides this discharge line 29 into a first branch line 29a and a second branch line 29b. The first branch line carries a fraction x of the preheated fuel to the internal combustion engine. This first branch line 29a therefore corresponds to fuel feed line 13 represented in FIG. 2. The second branch line 29b carries the remaining fraction y of the preheated fuel back into the fuel tank 14. There it mixes with the other reserve of fuel and together with this can be cooled down through the dissipation of heat to the ambient air. Such a dissipation of heat is particularly advantageous if at least the one fuel tank (or also multiple fuel tanks) is arranged in the area of the wings 5, as shown in FIG. 1. A large surface, which is thermally well connected to the tank contents, together with any other cooling structures such as cooling fins or the like, can additionally promote the dissipation of heat to the ambient air.

The division of the preheated fuel, as described, into a fraction x delivered to the internal combustion engine and a fraction y carried back into the tank 14 may be advantageous if the flow of medium needed for cooling the electric machine is greater than the flow of medium needed by the internal combustion engine as fuel 12. This is illustrated by the following example:

Kerosene, for example, may be used as fuel 12. Kerosene has an energy content of approximately 43 MJ/kg. Assuming an efficiency of the internal combustion engine 15 of approximately 50%, the latter needs a medium flow of kerosene of approximately 0.5 kg/s in order to generate 10 MW of mechanical drive power for the generator. In the generator a power loss, for example, of approximately 250 kW can arise, which has to be dissipated by the cooling system. If a heating of the fuel 12 of approximately 50 K in flowing through the generator 21 is allowed, a medium flow of kerosene of approximately 2.5 kg/s is needed to dissipate these losses, that is say about 5 times the quantity needed by the internal combustion engine 15. A possible operating mode might therefore provide for x with approximately 20% of the quantity of fuel flowing out of the generator and y correspondingly with approximately 80% of this quantity.

Figure 4:
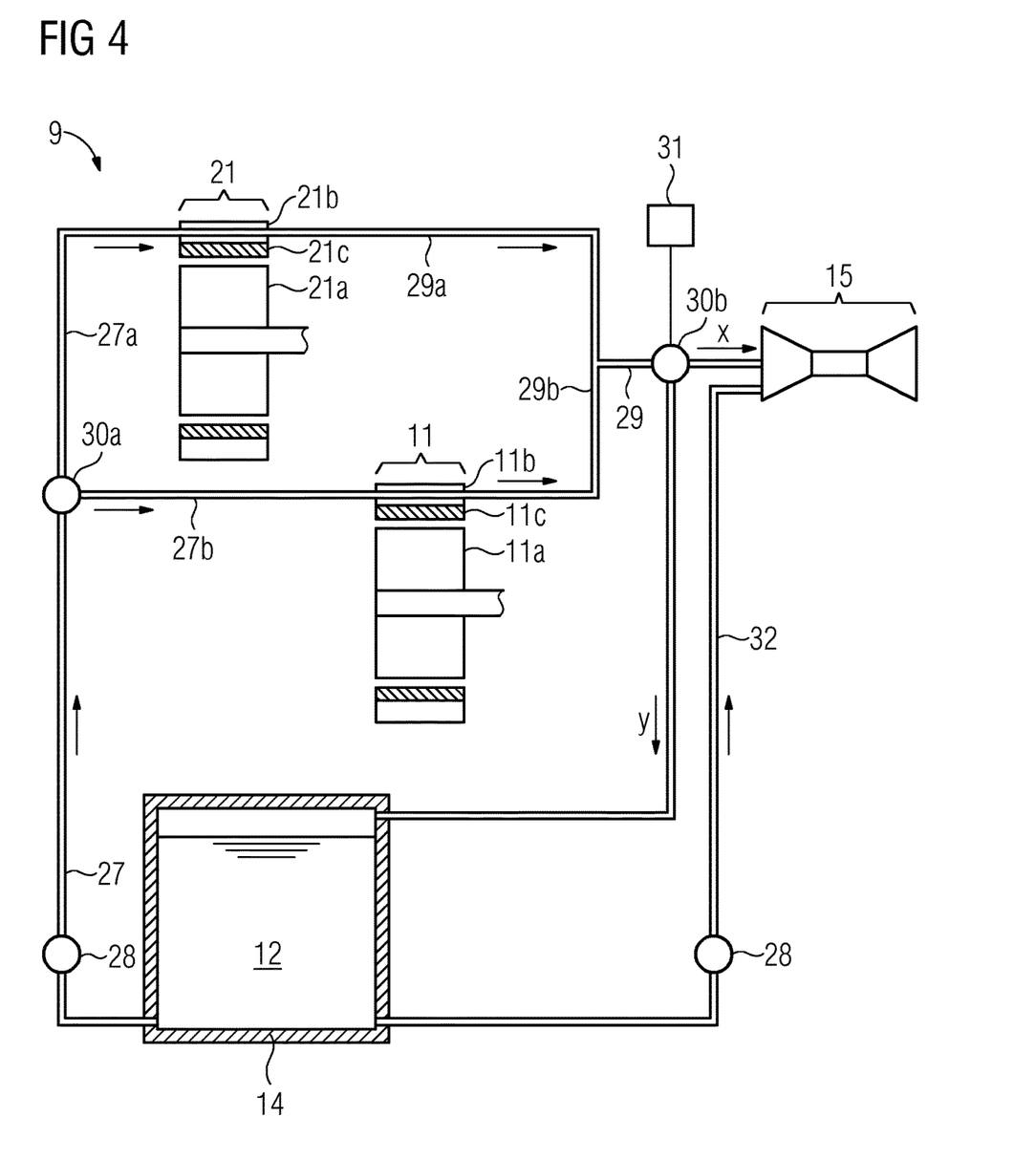
FIG. 4 shows a schematic representation of the flow of fuel in a drive system incorporating teachings of the present disclosure.

FIG. 4 shows a further, alternative example for the flow of fuel in a drive system 9. This drive system can also be configured with regard to the fundamental energy flux, in a manner similar to that shown in FIG. 2. FIG. 4 therefore shows many similar components to the drive system in FIG. 3, which in order to provide a better overview are identified with the same reference numerals. Thus, the drive system in FIG. 4 likewise comprises a fuel tank 14, a generator 21 and an internal combustion engine 15. Here also, as in FIG. 3, fuel 12 is carried out of the fuel tank 14 via a coolant admission line 27 as coolant into the generator 21, where its stator winding 21c is cooled.

In some embodiments, there is a similar cooling of the stator winding 11c of the rotor 11b of the electric motor 11. For this purpose, a first three-way directional control valve 30a, which divides the admission flow of fuel between two branch lines 27a and 27b, is arranged in the admission line 27. From there the first branch line carries fuel as coolant to the generator 21, and the second branch line 27b similarly carries fuel as coolant to the motor 11. Here too, the terms generator 21 and motor 11 may stand for multiple corresponding components, which together contribute to the energy flux in the drive system 9 and are similarly cooled by fuel.

After cooling the two electric machines 21 and 11, the fuel heated in the process is led away from the machines in the two branch lines 29a and 29b of the discharge line and then united in a common discharge line 29. This amounts overall, therefore, to parallel coolant paths for the two different electric machines. The temperature of the fuel used for cooling is therefore similar for both machines. If the cooling requirements of the two types of machine are different (for example because more individual machines of one type are used), it is also possible, in principle, to use a serial flow of coolant through machines arranged in succession.

Here too, in a manner similar to the example in FIG. 3, the fuel 12 in the coolant discharge line 29 is divided by a three-way directional control valve 30b into two fractions x and y. The fraction x is fed to the internal combustion engine, and the fraction y passes back into the fuel tank 14. In order to afford a facility for dynamic control of the two fractions, a control device 31 is provided on the three-way directional control valve 30b.

Should the temperature of the fraction x of the preheated fuel introduced into the internal combustion engine 15 nevertheless still be too high, fuel may additionally also be introduced directly from the fuel tank 14 into the internal combustion engine 15. This facility is likewise represented schematically in FIG. 4, in the form of the direct fuel feed 32, which by means of a further pump 28 can feed colder fuel from the reservoir of the tank 14. This additional, direct fuel feed may obviously also be used in other configurations of the cooling system, that is to say, for example, in cooling systems in which only one of the machines 21 and 11 is cooled by the fuel, as in FIG. 3. In an alternative to the configurations represented, with a division of the preheated fuel into two fractions x and y, it is also possible to feed all the preheated fuel into the internal combustion engine 15, and in particular at the same time to allow a greater heating of the fuel through cooling of the machine. In order to reach a predefined temperature range in the internal combustion engine, a fraction of fuel fed directly from the tank can then be added before feeding into the internal combustion engine. Here too, a three-way directional control valve with a control device may be used in order to set a temperature in a predefined range.

What is claimed is:

1. A drive system for a vehicle, the system comprising:
an internal combustion engine for converting chemical energy stored in a liquid fuel into mechanical energy;
a fuel tank for storing fuel for use by the internal combustion engine; and an electric machine having a rotor, a stator, and a cooling system for cooling at least one component of the electric machine using a cooling liquid;

wherein the cooling liquid comprises the fuel;

wherein, after the fuel cools the at least one component of the electric machine, a first portion of the fuel is fed into the internal combustion engine and a second portion of the fuel is fed back into the fuel tank.

2. The drive system as claimed in claim 1, wherein the fuel comprises kerosene.

3. The drive system as claimed in claim 1, wherein the electric machine has a power density of at least 5 kW/kg and/or a rated output of at least 5 MW.

4. The drive system as claimed in claim 1, wherein:

the internal combustion engine comprises a gas expansion turbine and a turbine shaft; and the gas expansion turbine transmits the mechanical energy generated to the turbine shaft.

5. The drive system as claimed in claim 1, wherein the electric machine comprises a generator converting the mechanical energy generated by the internal combustion engine into electrical energy for powering the vehicle.

6. The drive system as claimed in claim 1, wherein the electric machine comprises a motor powering the vehicle.

7. The drive system as claimed in claim 1, wherein the electric machine comprises a coil winding directly cooled by the cooling liquid.

8. The drive system as claimed in claim 1, wherein the cooling system comprises a coolant admission line to carry fuel from the fuel tank to an area of the electric machine to be cooled.

9. The drive system as claimed in claim 1, wherein the cooling system comprises a first coolant discharge line to the first portion of the fuel heated by the electric machine to the internal combustion engine for combustion.

10. The drive system as claimed in claim 1, wherein the cooling system comprises a second coolant discharge line to carry the second portion of the fuel heated by the electric machine back into the fuel tank for storage.

11. A vehicle comprising:

an internal combustion engine for converting chemical energy stored in a liquid fuel into mechanical energy;

a drive system using the mechanical energy to propel the vehicle;

a fuel tank for storing fuel for use by the internal combustion engine; and an electric machine having a rotor, a stator, and a cooling system for cooling at least one component of the electric machine using a cooling liquid;

wherein the cooling liquid comprises the fuel;

wherein, after the fuel cools the at least one component of the electric machine, a first portion of the fuel is fed into the internal combustion engine and a second portion of the fuel is fed back into the fuel tank.

12. A method for cooling an electric machine in a drive system, the method comprising:

feeding fuel from a fuel tank into a cooling system of the electric machine; and cooling at least one component of the electric machine with the fuel as cooling liquid;

wherein, after the fuel cools the at least one component of the electric machine, a first portion of the fuel is fed into the internal combustion engine and a second portion of the fuel is fed back into the fuel tank.

13. The method as claimed in claim 12, wherein an amount of the fuel heated by the electric machine that is carried into the internal combustion engine is controlled by a control device.

* * * * *